(12) United States Patent
Jöngren et al.

(10) Patent No.: US 9,780,971 B2
(45) Date of Patent: *Oct. 3, 2017

(54) POINT-DEPENDENT RESOURCE SYMBOL CONFIGURATION IN A WIRELESS CELL

(71) Applicant: Telefonaktiebolaget L M Ericsson (publ), Stockholm (SE)

(72) Inventors: George Jöngren, Stockholm (SE); Lars Lindbom, Karlstad (SE); Stefan Parkvall, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/988,903

(22) Filed: Jan. 6, 2016

(65) Prior Publication Data

US 2016/0197744 A1    Jul. 7, 2016

Related U.S. Application Data

(63) Continuation of application No. 13/389,603, filed as application No. PCT/SE2011/051309 on Nov. 2, 2011, now Pat. No. 9,264,927.
(Continued)

(51) Int. Cl.
| H04L 12/26 | (2006.01) |
| H04L 25/02 | (2006.01) |
(Continued)

(52) U.S. Cl.
CPC .......... *H04L 25/0204* (2013.01); *H04J 11/00* (2013.01); *H04L 5/0032* (2013.01);
(Continued)

(58) Field of Classification Search
CPC ...................................................... H04L 43/00
(Continued)

(56) References Cited

U.S. PATENT DOCUMENTS

| 8,995,293 B2 * | 3/2015 | Jongren | H04W 24/10 370/252 |
| 9,264,927 B2 * | 2/2016 | Jongren | H04W 16/32 |

(Continued)

FOREIGN PATENT DOCUMENTS

| CN | 101931996 A | 12/2010 |
| WO | 2010123270 A2 | 10/2010 |
| WO | 2011162661 A1 | 12/2011 |

OTHER PUBLICATIONS

Unknown, Author, "Baseline Schemes and Focus of CoMP Studies", 3GPP TSG-RAN WG1 #63bis, R1-110461, Dublin, Ireland, Jan. 17-21, 2011.

*Primary Examiner* — Christopher R Crompton
(74) *Attorney, Agent, or Firm* — Murphy, Bilak & Homiller, PLLC

(57) ABSTRACT

A high-power point and one or more low-power points transmit signals associated with the same cell-identifier in a heterogeneous cell deployment. Coverage areas corresponding to the low-power points fall at least partly within the coverage area for the high-power point, so that mobile stations within range of a low-power point are also within range of the high-power point. Channel-state-information reference symbols, CSI-RS, are transmitted using different CSI-RS resources on different transmission points within the cell, while configuration of CSI-RS measurement resources is conducted on a UE-specific basis. The choice of measurement resources to be used is determined by the network, based on the properties of the channels from the transmission points to the UE. As the UE moves around within the cell, the network tracks the channel properties and reconfigures the CSI-RS resources measured by the UE, to correspond to the resource of the closest transmission point or points.

8 Claims, 9 Drawing Sheets

Related U.S. Application Data

(60) Provisional application No. 61/440,923, filed on Feb. 9, 2011.

(51) Int. Cl.
| | | |
|---|---|---|
| *H04W 16/32* | (2009.01) | |
| *H04W 24/10* | (2009.01) | |
| *H04J 11/00* | (2006.01) | |
| *H04W 52/24* | (2009.01) | |
| *H04W 72/12* | (2009.01) | |
| *H04L 5/00* | (2006.01) | |
| *H04W 88/02* | (2009.01) | |

(52) U.S. Cl.
CPC .......... *H04L 5/0057* (2013.01); *H04W 16/32* (2013.01); *H04W 24/10* (2013.01); *H04W 52/244* (2013.01); *H04W 72/1226* (2013.01); *H04L 5/0048* (2013.01); *H04W 88/02* (2013.01); *Y02B 60/50* (2013.01)

(58) Field of Classification Search
USPC .......................................................... 370/252
See application file for complete search history.

(56) References Cited

U.S. PATENT DOCUMENTS

| | | | |
|---|---|---|---|
| 9,357,424 B2 * | 5/2016 | Jongren | H04W 24/10 |
| 2010/0271968 A1 | 10/2010 | Liu et al. | |
| 2010/0303039 A1 * | 12/2010 | Zhang | H04L 5/0035 |
| | | | 370/331 |
| 2010/0323720 A1 * | 12/2010 | Jen | H04B 7/2606 |
| | | | 455/456.1 |
| 2011/0038302 A1 * | 2/2011 | Papasakellariou | H04L 5/0007 |
| | | | 370/315 |
| 2012/0201163 A1 | 8/2012 | Jongren | |

* cited by examiner

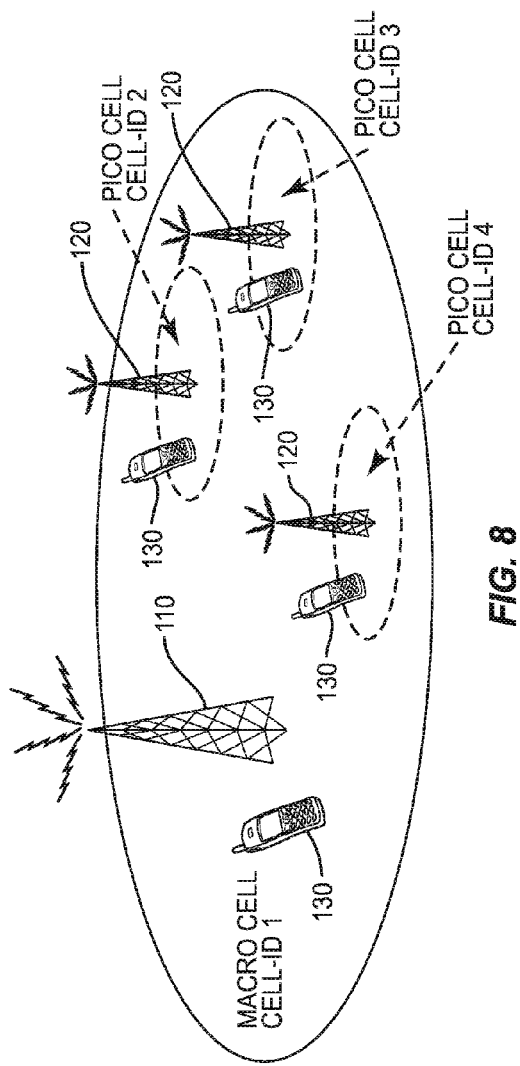
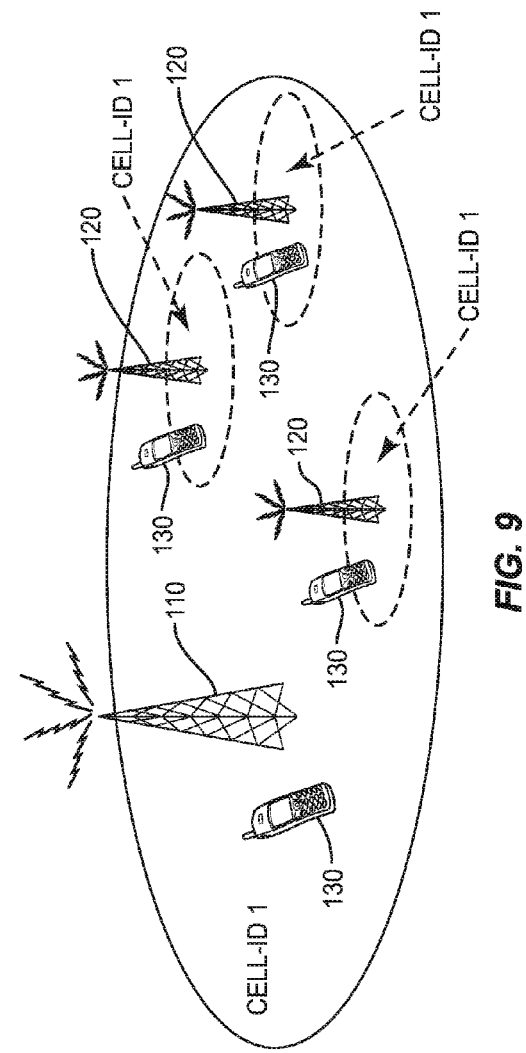

POINT-DEPENDENT RESOURCE SYMBOL CONFIGURATION IN A WIRELESS CELL

RELATED APPLICATIONS

The present application is a continuation of U.S. patent application Ser. No. 13/389,603, filed 9 Feb. 2012, which was a national stage entry under 35 U.S.C. §371 of international patent application serial no. PCT/SE2011/051309, filed 2 Nov. 2011, which claimed the benefit of U.S. provisional application Ser. No. 61/440,923, filed 9 Feb. 2011. The entire contents of each of these applications are incorporated herein by reference.

TECHNICAL FIELD

The present invention relates generally to the control of devices in wireless communication networks, and more particularly relates to techniques for allocating and using reference signals in networks having heterogeneous cell deployments.

BACKGROUND

The $3^{rd}$-Generation Partnership Project (3GPP) is continuing development of the fourth-generation wireless network technologies known as Long-Term Evolution (LTE). Improved support for heterogeneous network operations is part of the ongoing specification of 3GPP LTE Release-10, and further improvements are being discussed in the context of new features for Release-11. In heterogeneous networks, a mixture of cells of different sizes and overlapping coverage areas are deployed.

One example of such a deployment is seen in the system 100 illustrated in FIG. 1, where several pico-cells 120, each with a respective coverage area 150, are deployed within the larger coverage area 140 of a macro-cell 110. The system 100 of FIG. 1 is suggestive of a wide-area wireless network deployment. However, other examples of low power nodes, also referred to as "points," in heterogeneous networks are home base stations and relays.

Throughout this document, nodes or points in a network are often referred to as being of a certain type, e.g., a "macro" node, or a "pico" point. However, unless explicitly stated otherwise, this should not be interpreted as an absolute quantification of the role of the node or point in the network but rather as a convenient way of discussing the roles of different nodes or points relative to one another. Thus, a discussion about macro- and pico-cells could just as well be applicable to the interaction between micro-cells and femto-cells, for example.

One aim of deploying low-power nodes such as pico base stations within the macro coverage area is to improve system capacity, by means of cell-splitting gains. In addition to improving overall system capacity, this approach also allows users to be provided with a wide-area experience of very-high-speed data access, throughout the network. Heterogeneous deployments are in particular effective to cover traffic hotspots, i.e., small geographical areas with high user densities. These areas can be served by pico cells, for example, as an alternative deployment to a denser macro network.

The most basic means to operate heterogeneous networks is to apply frequency separation between the different layers. For instance, the macro-cell 110 and pico-cells 120 pictured in FIG. 1 can be configured to operate on different, non-overlapping carrier frequencies, thus avoiding any interference between the layers. With no macro-cell interference towards the under-laid cells, cell-splitting gains are achieved when all resources can simultaneously be used by the under-laid cells.

One drawback of operating layers on different carrier frequencies is that it may lead to inefficiencies in resource utilization. For example, if there is a low level of activity in the pico-cells, it could be more efficient to use all carrier frequencies in the macro-cell, and then basically switch off the pico-cells. However, the split of carrier frequencies across layers in this basic configuration is typically done in a static manner.

Another approach to operating a heterogeneous network is to share radio resources between layers. Thus, two (or more) layers can use the same carrier frequencies, by coordinating transmissions across macro- and under-laid cells. This type of coordination is referred to as inter-cell interference coordination (ICIC). With this approach, certain radio resources are allocated to the macro cells for a given time period, whereas the remaining resources can be accessed by the under-laid cells without interference from the macro cell. Depending on the traffic situations across the layers, this resource split can change over time to accommodate different traffic demands. In contrast to the earlier described static allocation of carrier frequencies, this way of sharing radio resources across layers can be made more or less dynamic depending on the implementation of the interface between the nodes. In LTE, for example, an X2 interface has been specified in order to exchange different types of information between base station nodes, for coordination of resources. One example of such information exchange is that a base station can inform other base stations that it will reduce transmit power on certain resources.

Time synchronization between base station nodes is generally required to ensure that ICIC across layers will work efficiently in heterogeneous networks. This is of particular importance for time-domain-based ICIC schemes, where resources are shared in time on the same carrier Orthogonal Frequency-Division Multiplexing (OFDM) technology is a key underlying component of LTE. As is well known to those skilled in the art, OFDM is a digital multi-carrier modulation scheme employing a large number of closely-spaced orthogonal sub-carriers. Each sub-carrier is separately modulated using conventional modulation techniques and channel coding schemes. In particular, 3GPP has specified Orthogonal Frequency Division Multiple Access (OFDMA) for the downlink transmissions from the base station to a mobile terminal, and single carrier frequency division multiple access (SC-FDMA) for uplink transmissions from a mobile terminal to a base station. Both multiple access schemes permit the available sub-carriers to be allocated among several users.

SC-FDMA technology employs specially formed OFDM signals, and is therefore often called "pre-coded OFDM" or Discrete-Fourier-Transform (DFT)-spread OFDM. Although similar in many respects to conventional OFDMA technology, SC-FDMA signals offer a reduced peak-to-average power ratio (PAPR) compared to OFDMA signals, thus allowing transmitter power amplifiers to be operated more efficiently. This in turn facilitates more efficient usage of a mobile terminal's limited battery resources. (SC-FDMA is described more fully in Myung, et al., "Single Carrier FDMA for Uplink Wireless Transmission," *IEEE Vehicular Technology Magazine*, vol. 1, no. 3, September 2006, pp. 30-38.)

The basic LTE physical resource can be seen as a time-frequency grid. This concept is illustrated in FIG. 2, which shows a number of so-called subcarriers in the frequency domain, at a frequency spacing of Δf, divided into OFDM symbol intervals in the time domain. Each individual element of the resource grid 210 is called a resource element 220, and corresponds to one subcarrier during one OFDM symbol interval, on a given antenna port. One of the unique aspects of OFDM is that each symbol 230 begins with a cyclic prefix 240, which is essentially a reproduction of the last portion of the symbol 230 affixed to the beginning. This feature minimizes problems from multipath, over a wide range of radio signal environments.

In the time domain, LTE downlink transmissions are organized into radio frames of ten milliseconds each, each radio frame consisting of ten equally-sized subframes of one millisecond duration. This is illustrated in FIG. 3, where an LTE signal 310 includes several frames 320, each of which is divided into ten subframes 330. Not shown in FIG. 3 is that each subframe 330 is further divided into two slots, each of which is 0.5 milliseconds in duration.

LTE link resources are organized into "resource blocks," defined as time-frequency blocks with a duration of 0.5 milliseconds, corresponding to one slot, and encompassing a bandwidth of 180 kHz, corresponding to 12 contiguous sub-carriers with a spacing of 15 kHz. Resource blocks are numbered in the frequency domain, starting with 0 from one end of the system bandwidth. Two time-consecutive resource blocks represent a resource block pair, and correspond to the time interval upon which scheduling operates. Of course, the exact definition of a resource block may vary between LTE and similar systems, and the inventive methods and apparatus described herein are not limited to the numbers used herein.

In general, however, resource blocks may be dynamically assigned to mobile terminals, and may be assigned independently for the uplink and the downlink. Depending on a mobile terminal's data throughput needs, the system resources allocated to it may be increased by allocating resource blocks across several sub-frames, or across several frequency blocks, or both. Thus, the instantaneous bandwidth allocated to a mobile terminal in a scheduling process may be dynamically adapted to respond to changing conditions.

For scheduling of downlink data, the base station transmits control information in each subframe. This control information identifies the mobile terminals to which data is targeted and the resource blocks, in the current downlink subframe, that are carrying the data for each terminal. The first one, two, three, or four OFDM symbols in each subframe are used to carry this control signaling. In FIG. 4, a downlink subframe 410 is shown, with three OFDM symbols allocated to control region 420. The control region 420 consists primarily of control data elements 434, but also includes a number of reference symbols 432, used by the receiving station to measure channel conditions. These reference symbols 432 are interspersed at pre-determined locations throughout the control region 420 and among the data symbols 436 in the data portion 430 of the subframe 410.

Transmissions in LTE are dynamically scheduled in each subframe, where the base station transmits downlink assignments/uplink grants to certain mobile terminals (user equipment, or UEs, in 3GPP terminology) via the physical downlink control channel (PDCCH). The PDCCHs are transmitted in the control region of the OFDM signal, i.e., in the first OFDM symbol(s) of each subframe, and span all or almost all of the entire system bandwidth. A UE that has decoded a downlink assignment, carried by a PDCCH, knows which resource elements in the subframe that contain data aimed for that particular UE. Similarly, upon receiving an uplink grant, the UE knows which time-frequency resources it should transmit upon. In the LTE downlink, data is carried by the physical downlink shared channel (PDSCH) and in the uplink the corresponding channel is referred to as the physical uplink shared channel (PUSCH).

LTE also employs multiple modulation formats, including at least QPSK, 16-QAM, and 64-QAM, as well as advanced coding techniques, so that data throughput may be optimized for any of a variety of signal conditions. Depending on the signal conditions and the desired data rate, a suitable combination of modulation format, coding scheme, and bandwidth is chosen, generally to maximize the system throughput. Power control is also employed to ensure acceptable bit error rates while minimizing interference between cells. In addition, LTE uses a hybrid-ARQ (HARQ) error correction protocol where, after receiving downlink data in a subframe, the terminal attempts to decode it and reports to the base station whether the decoding was successful (ACK) or not (NACK). In the event of an unsuccessful decoding attempt, the base station can retransmit the erroneous data.

SUMMARY

In several embodiments of the invention, channel-state-information reference symbols (CSI-RS) are transmitted using different CSI-RS resources on different transmission points within the same cell, while configuration of CSI-RS measurement resources is conducted on a UE-specific basis. The choice of measurement resources to be used is determined by the network, based on the properties of the channels from the transmission points to the UE of interest. As a UE moves around within the cell, the network tracks the channel properties and reconfigures the CSI-RS resources measured by the UE, to correspond to the resource of the "closest" transmission point or points.

More particularly, methods are provided for collecting channel-state-information (CSI) feedback in a wireless network cell that features a heterogeneous deployment of transmitting points, i.e., including a plurality of geographically separated transmission points sharing a cell identifier and that include a primary transmission point, having a first coverage area, and one or more secondary transmission points, each having a corresponding coverage area that is at least partly within the first coverage area. These methods may be carried out at one or more nodes in the radio access network, such as at a control node connected via signaling interfaces to each of the transmission points.

In an example method, the network receives CSI feedback from a mobile station, based on measurements of first CSI reference symbols (CSI-RS) transmitted on a first CSI-RS resource from a first one of the transmission points. The network then detects that the mobile station has approached a second one of the transmission points, differing from the first one of the transmission points. In some cases, this detection is performed by measuring one or more uplink transmissions from the mobile station at the second one of the transmission points and assessing channel strength based on the measurements. The measured uplink transmission may include, for example, one or more of a Sounding Reference Signal (SRS), a Physical Uplink Control Channel (PUCCH) transmission, and a Physical Uplink Shared Channel (PUSCH) transmission.

The network then reconfigures the mobile station to measure CSI-RS on a second CSI-RS resource; these CSI-RS are transmitted from the second one of the transmission points. Finally, the network again receives CSI feedback from the mobile station, this time based on measurements of second CSI-RS transmitted on the second CSI-RS resource from the second one of the transmission points.

In some embodiments, such as in a coordinated multipoint (CoMP) scenario, the network can configure the mobile station to also measure CSI-RS on a third CSI-RS resource transmitted from a third one of the transmission points at the same general time that CSI-RS are also being transmitted from the second transmission point. In this case, the CSI feedback received from the mobile station is further based on measurements of the third CSI-RS, and is thus useful for characterizing the compound channel between the mobile station and the two (or more) different transmission points.

Another example process for collecting channel-state-information (CSI) feedback begins with the transmitting of CSI-RS from all of several points in the cell, over a given time interval. In many instances, CSI-RS will be transmitted more-or-less simultaneously from all points in the cell, i.e., from all points that share the same cell-id, but this is not strictly necessary. A subset of the CSI-RS resources are selected for CSI feedback from a mobile station, based on channel strength measurements corresponding to the mobile station and the transmission points. The mobile station is then configured to provide CSI feedback for at least the selected CSI-RS resources for use in evaluating the channel between the mobile station and one or several of the transmission points.

In some cases, selecting the subset of the CSI-RS resources is based on measurements of an uplink transmission at one or more of the transmission points. Again, this measured uplink transmission may include one or more of a Sounding Reference Signal (SRS), a Physical Uplink Control Channel (PUCCH) transmission, and a Physical Uplink Shared Channel (PUSCH) transmission. In other cases, the subset of the CSI-RS resources is based on measurement data sent by the mobile station to one or more of the transmission points. In still other cases, a combination of both sources of information may be used.

Apparatus for carrying out the various processes disclosed herein are also described, including a system of transmitting nodes in a wireless network, a corresponding control unit, and a corresponding mobile station. Of course, the present invention is not limited to the features and advantages summarized above. Indeed, those skilled in the art will recognize additional features and advantages of the present invention upon reading the following detailed description and viewing the attached drawings.

BRIEF DESCRIPTION OF THE DRAWINGS

FIG. 8 illustrates a heterogeneous cell deployment where a separate cell-id is used for each point.

FIG. 9 illustrates a heterogeneous cell deployment where the cell-id is shared between the macro-point and pico-points in the macro-point's coverage area.

DETAILED DESCRIPTION

Figure 1:
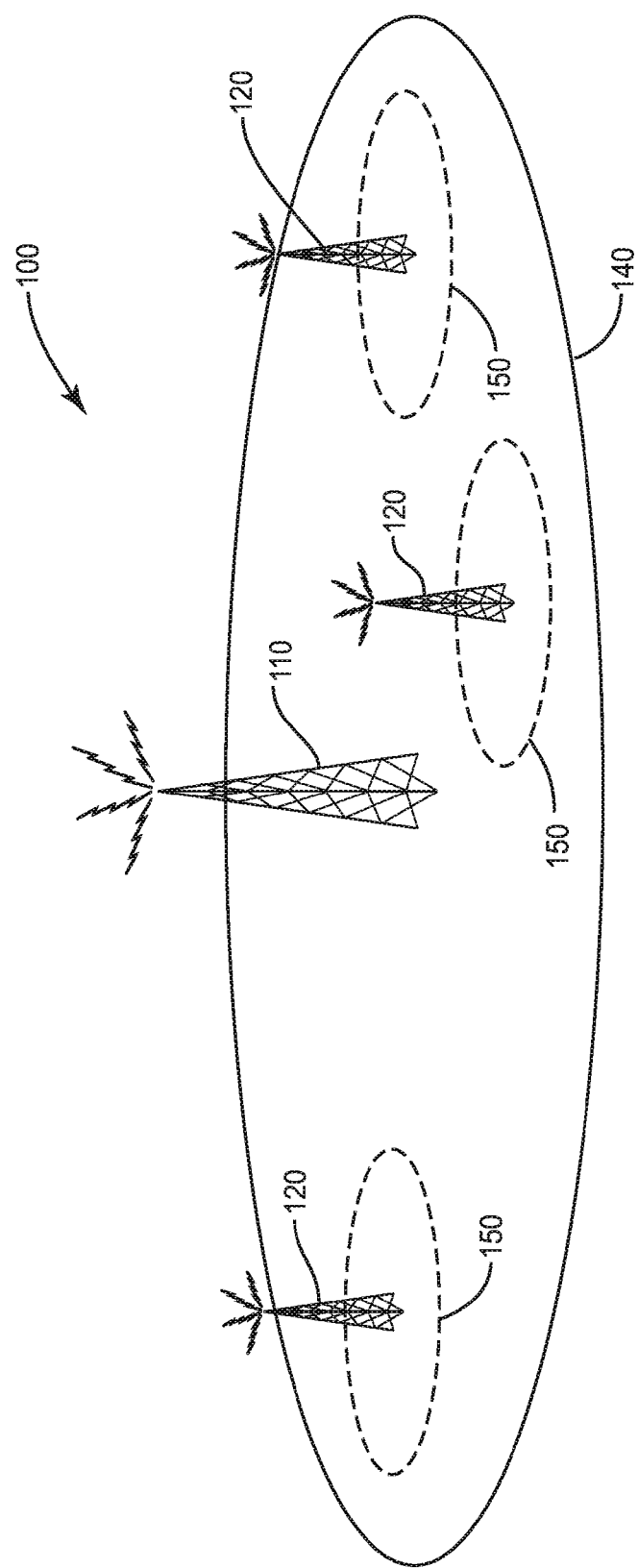
FIG. 1 illustrates several pico-cells overlaid by a macro-cell.
Figure 2:
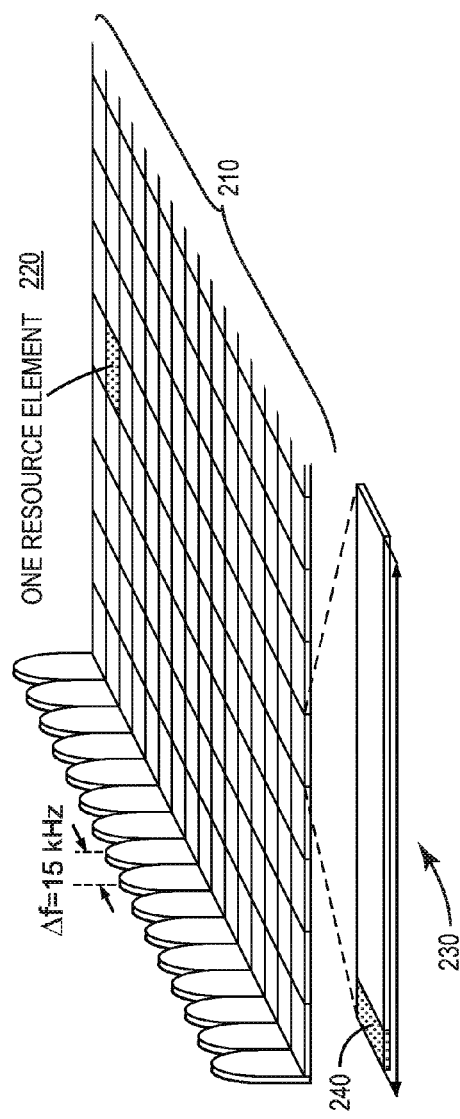
FIG. 2 illustrates features of the OFDM time-frequency resource grid.
Figure 3:
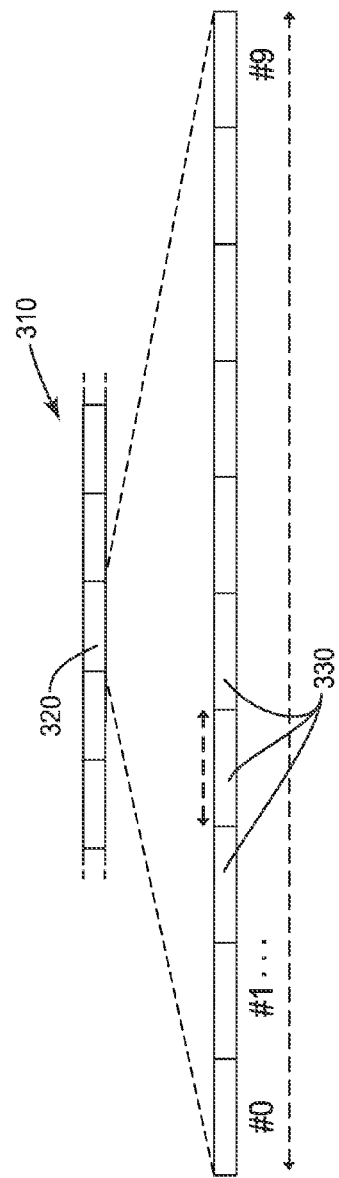
FIG. 3 illustrates the time-domain structure of an LTE signal.

Various embodiments of the present invention are now described with reference to the drawings, where like reference numerals are used to refer to like elements throughout. In the following description, numerous specific details are set forth for purposes of explanation, in order to provide a thorough understanding of one or more embodiments. It will be evident to one of ordinary skill in the art, however, that some embodiments of the present invention may be implemented or practiced without one or more of these specific details. In other instances, well-known structures and devices are shown in block diagram form in order to facilitate describing embodiments.

Note that although terminology from 3GPP's specifications for LTE and LTE-Advanced is used throughout this document to exemplify the invention, this should not be seen as limiting the scope of the invention to only these systems. Other wireless systems including or adapted to include heterogeneous cell deployments may also benefit from exploiting the ideas covered herein.

Demodulation of transmitted data generally requires estimation of the radio channel. In LTE systems, this is done using transmitted reference symbols (RS), i.e., transmitted symbols having values that are already known to the receiver. In LTE, cell-specific reference symbols (CRS) are transmitted in all downlink subframes. In addition to assisting downlink channel estimation, the CRS are also used for mobility measurements performed by the UEs.

The CRS are generally intended for use by all the mobile terminals in the coverage area. To support improved channel estimation, especially when multiple-input multiple-output (MIMO) transmission techniques are used, LTE also supports UE-specific RS, which are targeted to individual mobile terminals and are intended specifically for channel estimation for demodulation purposes.

Figure 4:
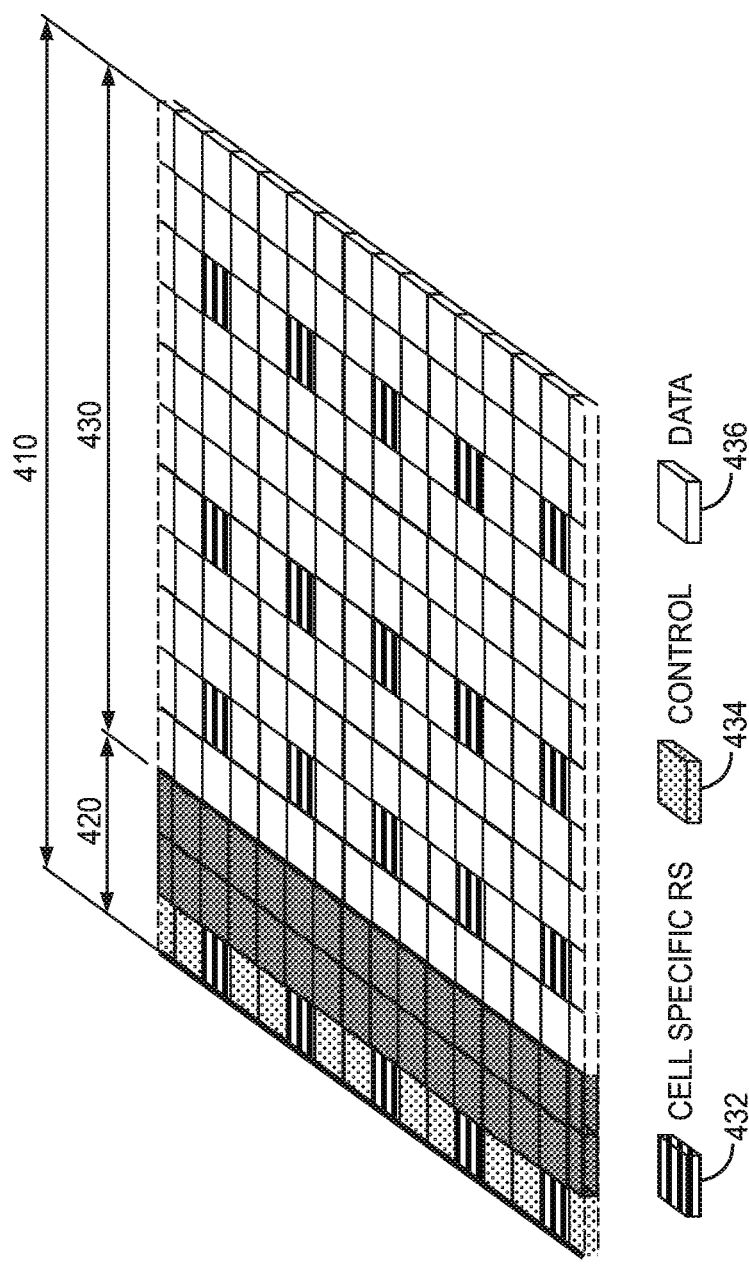
FIG. 4 illustrates features of an LTE downlink subframe.

FIG. 4 illustrates how the mapping of physical control/data channels and signals can be done on resource elements within a downlink subframe 410. In the pictured example, the PDCCHs occupy only the first out of the three possible OFDM symbols that make up the control region 420, so in this particular case the mapping of data can begin at the second OFDM symbol. Since the CRS are common to all UEs in the cell, the transmission of CRS cannot be easily adapted to suit the needs of a particular UE. This is in contrast to UE-specific RS, by means of which each UE can have RS of its own placed in the data region 430 of FIG. 4, as part of PDSCH.

The length (one, two, or three symbols) of the control region that is used to carry PDCCH can vary on a subframe-to-subframe basis, and is signaled to the UE in the Physical Control Format Indicator CHannel (PCFICH). The PCFICH is transmitted within the control region, at locations known by terminals. Once a terminal has decoded the PCFICH, it then knows the size of the control region and in which OFDM symbol the data transmission starts. Also transmitted in the control region is the Physical Hybrid-ARQ Indicator Channel. This channel carries ACK/NACK responses to a terminal, to inform the mobile terminal whether the uplink data transmission in a previous subframe was successfully decoded by the base station.

As noted above, CRS are not the only reference symbols available in LTE. As of LTE Release-10, a new RS concept was introduced. Separate UE-specific RS for demodulation of PDSCH are supported in Release 10, as are RS specifically provided for measuring the channel for the purpose of generating channel state information (CSI) feedback from the UE. The latter reference symbols are referred to as CSI-RS. CSI-RS are not transmitted in every subframe, and they are generally sparser in time and frequency than RS used for demodulation. CSI-RS transmissions may take place every fifth, tenth, twentieth, fortieth, or eightieth subframe, as determined by a periodicity parameter and a subframe offset, each of which are configured by Radio Resource Control (RRC) signaling.

A UE operating in connected mode can be requested by the base station to perform channel state information (CSI) reporting. This reporting can include, for example, reporting a suitable rank indicator (RI) and one or more precoding matrix indices (PMIs), given the observed channel conditions, as well as a channel quality indicator (Cal). Other types of CSI are also conceivable, including explicit channel feedback and interference covariance feedback. The CSI feedback assists the base station in scheduling, including deciding which subframe and resource blocks to use for the transmission, as well as deciding which transmission scheme and/or precoder should be used. The CSI feedback also provides information that can be used to determine a proper user bit-rate for the transmission, i.e., for link adaptation.

In LTE, both periodic and aperiodic CSI reporting are supported. In the case of periodic CSI reporting, the terminal reports the CSI measurements on a configured periodic time basis, using the physical uplink control channel (PUCCH). With aperiodic reporting, the CSI feedback is transmitted on the physical uplink shared channel (PUSCH) at pre-specified time instants after receiving the CSI grant from the base station. With aperiodic CSI reports, the base station can thus request CSI that reflects downlink radio conditions in a particular subframe.

Figure 5:
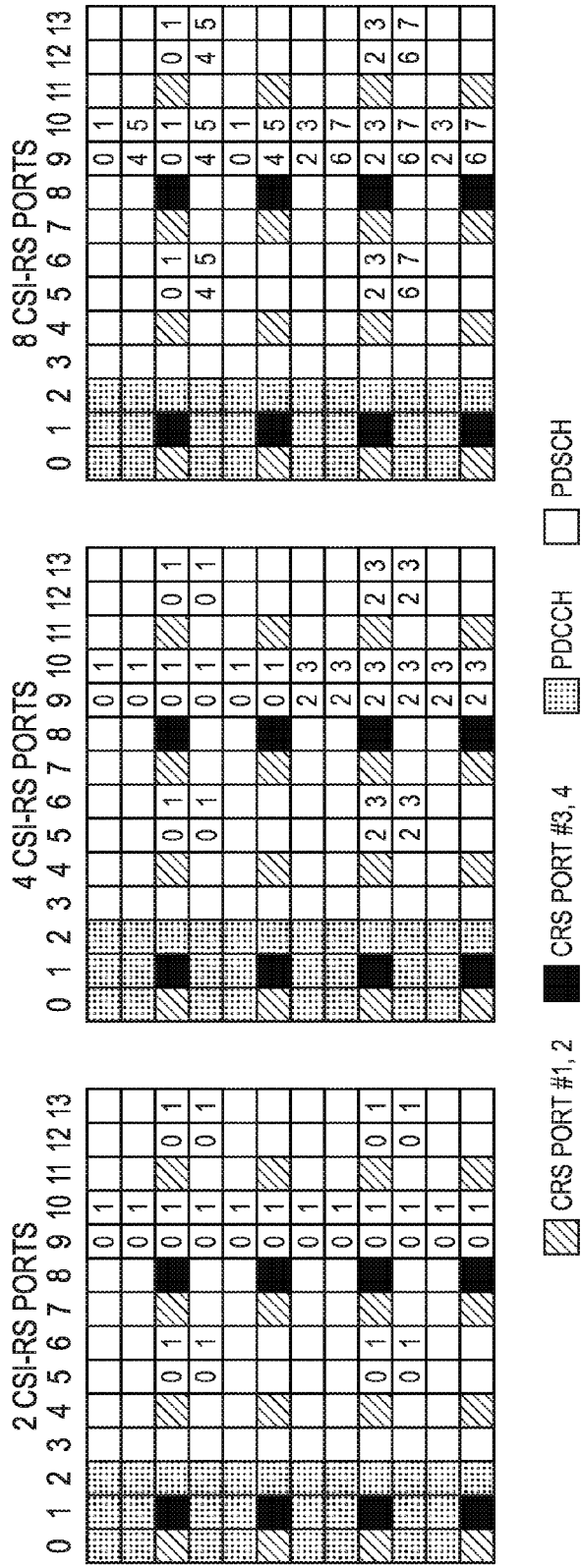
FIG. 5 illustrates the mapping of CSI-RS to an LTE resource grid for two, four, and eight antenna ports.

A detailed illustration of which resource elements within a resource block pair that may potentially be occupied by the new UE-specific RS and CSI-RS is provided in FIG. 5, for the cases in which two, four, and eight transmitter antenna ports are used for the CSI transmission. The CSI-RS utilizes an orthogonal cover code of length two to overlay two antenna ports on two consecutive resource elements. In other words, the CSI-RS are allocated in pairs, where two orthogonal codes of length two are transmitted simultaneously, using the same pair of allocated resource elements, from a pair of antenna ports at the base station.

In FIG. 5, the CSI-RS resource elements are designated with numbers, which correspond to antenna port numbers. In the left-hand diagram, corresponding to the case of two CSI-RS antenna ports, the possible positions for the CSI-RS are labeled "0" and "1", corresponding to antenna ports 0 and 1.

As can be seen in FIG. 5, many different CSI-RS patterns are available. For the case of two CSI-RS antenna ports, for instance, where each CSI-RS pair can be separately configured, there are twenty different patterns within a subframe. When there are four CSI-RS antenna ports, the CSI-RS pairs are assigned two at a time; thus the number of possible patterns is ten. For the case of eight CSI-RS antenna ports, five patterns are available. For time-division duplex (TDD) mode, some additional CSI-RS patterns are available.

In the following discussion, the term "CSI-RS resource" is used. A CSI-RS resource corresponds to a particular pattern present in a particular subframe. Thus two different patterns in the same subframe constitute two distinct CSI-RSI resources. Likewise, the application of the same CSI-RS pattern to two different subframes again represents two separate instances of a CSI-RS resource, and the two instances are thus again to be considered distinct CSI-RS resources.

Any of the various CSI-RS patterns pictured in FIG. 5 may also correspond to so-called zero-power CSI-RS, which are also referred to as muted resource elements (REs). A zero-power CSI-RS is a CSI-RS pattern whose resource elements are silent, i.e., there is no transmitted signal on those resource elements. These silent patterns are configured with a resolution corresponding to the four-antenna-port CSI-RS patterns. Hence, the smallest unit of silence that may be configured corresponds to four REs.

The purpose of zero-power CSI-RS is to raise the signal-to-interference-plus-noise ratio (SINR) for CSI-RS in a given cell, by configuring zero-power CSI-RS in interfering cells so that the resource elements that would otherwise cause interference are silent. Thus, a CSI-RS pattern in a given cell is matched with a corresponding zero-power CSI-RS pattern in interfering cells.

Raising the SINR level for CSI-RS measurements is particularly important in applications such as coordinated multi point (CoMP) or in heterogeneous deployments. In CoMP, the UE is likely to need to measure the channel from non-serving cells. Interference from the much stronger serving cell would make those measurements difficult, if not impossible. Zero-power CSI-RS are also needed in heterogeneous deployments, where zero-power CSI-RS in the macro-layer are configured to coincide with CSI-RS transmissions in the pico-layer. This avoids strong interference from macro nodes when UEs measure the channel to a pico-node.

The PDSCH, which carries data targeted for mobile stations, is mapped around the resource elements occupied by CSI-RS and zero-power CSI-RS, so it is important that both the network and the UE are assuming the same CSI-RS and zero power CSI-RS configurations. Otherwise, the UE may be unable to properly decode the PDSCH in subframes that contain CSI-RS or their zero-power counterparts.

The CSI-RS discussed above is used for measurements of the downlink channel, i.e., from a base station to a mobile terminal. In the uplink, so-called sounding reference symbols (SRS) may be used for acquiring CSI about the uplink channel from the UE to a receiving node. When SRS is used, it is transmitted on the last DFT-spread OFDM symbol of a subframe. SRS can be configured for periodic transmission as well for dynamic triggering as part of the uplink grant. The primary use for SRS is to aid the scheduling and link adaptation in the uplink. For time-division duplex (TDD) LTE systems, however, SRS is sometimes used to determine beam-forming weights for the downlink, by exploiting the fact that the downlink and uplink channels are the same when the same carrier frequency is used for downlink and uplink (channel reciprocity).

While PUSCH carries data in the uplink, PUCCH is used for control. PUCCH is a narrowband channel using a resource block pair where the two resource blocks are on opposite sides of the potential scheduling bandwidth. PUCCH is used for conveying ACK/NACKs, periodic CSI feedback, and scheduling request to the network.

Before an LTE terminal can communicate with an LTE network it first has to find and acquire synchronization to a cell within the network, a process known as cell search. Next, the UE has to receive and decode system information needed to communicate with and operate properly within the cell. Finally, the UE can access the cell by means of the so-called random-access procedure.

In order to support mobility, a terminal needs to continuously search for, synchronize to, and estimate the reception quality of both its serving cell and neighbor cells. The reception quality of the neighbor cells, in relation to the reception quality of the current cell, is then evaluated in order to determine whether a handover (for terminals in connected mode) or cell re-selection (for terminals in idle mode) should be carried out. For terminals in connected mode, the handover decision is taken by the network, based on measurement reports provided by the terminals. Examples of such reports are reference signal received power (RSRP) and reference signal received quality (RSRQ).

The results of these measurements, which are possibly complemented by a configurable offset, can be used in several ways. The UE can, for example, be connected to the cell with the strongest received power. Alternatively, the UE can be assigned to the cell with the best path gain. An approach somewhere between these alternatives may be used.

These selection strategies do not always result in the same selected cell for any given set of circumstances, since the base station output powers of cells of different type are different. This is sometimes referred to as link imbalance. For example, the output power of a pico base station or a relay node is often on the order of 30 dBm (1 watt) or less, while a macro base station can have an output power of 46 dBm (40 watts). Consequently, even in the proximity of the pico cell, the downlink signal strength from the macro cell can be larger than that of the pico cell. From a downlink perspective, it is often better to select a cell based on downlink received power, whereas from an uplink perspective, it would be better to select a cell based on the path loss.

Figure 6:
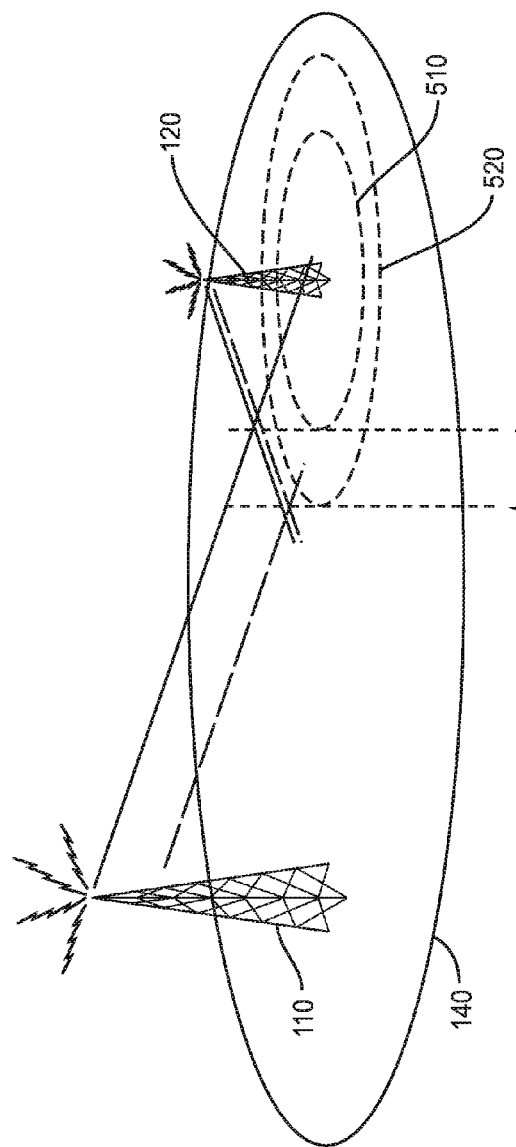
FIG. 6 illustrates the differences between uplink and downlink coverage in a mixed cell scenario.

These alternative cell selection approaches are illustrated in FIG. 6. The solid lines emanating from each of macro-cell 110 and pico-cell 120 represent the received power at each point between the two cells. These lines intersect, i.e., are equal, at border 540. Accordingly, a UE within region 510 will see a stronger received signal from the pico-cell 120, and will get the best downlink performance if it selects pico-cell 120. The dashed lines issuing from pico-cell 120 and macro-cell 110, on the other hand, represent the path loss between a UE at a given point and either the macro-cell 110 or the pico-cell 120. Because the path loss is not weighted by the transmitter output power, these lines intersect at a point halfway between macro-cell 110 and pico-cell 120, as seen at the boundary 530. A UE outside region 520, then, will experience a lower path loss to macro-cell 110 than to pico-cell 120, and will thus achieve better uplink performance if it selects macro-cell 110. Because of this unbalanced situation, there is a region, i.e., the portion of coverage area 520 that is outside coverage area 510, in which neither cell is optimal for both downlink and uplink performance at the same time.

From a system perspective, it might often be better, in the above scenario, for a given UE to connect to the pico-cell 120 even under some circumstances where the downlink from macro-cell 110 is much stronger than the pico cell downlink. However, ICIC across layers will be needed when the terminal operates within the region between the uplink and downlink borders, i.e., the link imbalance zone, as depicted in FIG. 6. Interference coordination across the cell layers is especially important for the downlink control signaling. If the interference is not handled appropriately, a terminal that is in the region between the downlink and uplink borders in FIG. 6 and is connected to pico-cell 120 may be unable to receive the downlink control signaling from the pico-cell 120.

Figure 7:
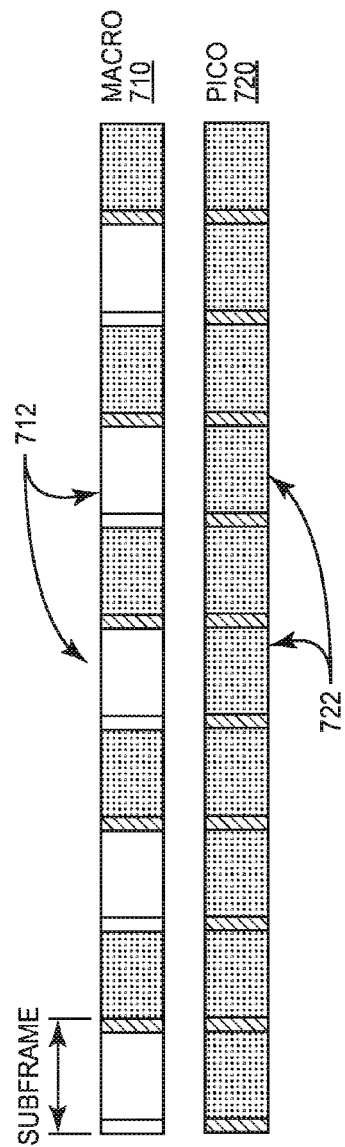
FIG. 7 illustrates the use of inter-cell interference coordination in downlink subframes in a heterogeneous network.

One approach to providing ICIC across layers is illustrated in FIG. 7. An interfering macro-cell, which could create downlink interference towards a pico-cell, transmits a series of subframes 710, but avoids scheduling unicast traffic in certain subframes 712. In other words, neither PDCCHs nor PDSCH are transmitted in those subframes 712. In this way, it is possible to create low-interference subframes, which can be used to protect users of the pico-cell who are operating in the link imbalance zone.

To carry out this approach, the macro-base station (MeNB) indicates to the pico-base station (PeNB), via the backhaul interface X2, which subframes will not be used to schedule users. The PeNB can then take this information into account when scheduling users operating within the link imbalance zone, such that these users are scheduled only in subframes 722 aligned with the low-interference subframes transmitted in the macro layer. In other words, these users are scheduled only in interference-protected subframes. Pico-cell users operating within the downlink border, e.g., within coverage area 510 in FIG. 6, can be scheduled in all subframes, i.e., in both the protected subframes 722 as well as the remaining, un-protected, subframes in the series of subframes 720.

In principle, data transmission (but not control signaling) in different layers could also be separated in the frequency domain by ensuring that scheduling decisions in the two cell layers are non-overlapping in the frequency domain. This could be facilitated by exchanging coordination messages between the different base stations. However, this is not possible for the control signaling, since the control signaling spans the full bandwidth of the signal, according to the LTE specifications, and hence a time-domain approach must be used.

The classical way of deploying a network is for each different transmission/reception point to provide coverage for a cell that is distinct from all others. That is, the signals transmitted from or received at a point is associated with a cell identifier (cell-id) that is different from the cell-id employed for other nearby points. Typically, each of these points transmits its own unique signals for broadcast (PBCH) and sync channels (PSS, SSS).

The concept of a "point" is heavily used in conjunction with techniques for coordinated multipoint (CoMP). In this context, a point corresponds to a set of antennas covering essentially the same geographical area in a similar manner. Thus, a point might correspond to one of the sectors at a site, but it may also correspond to a site having one or more antennas all intending to cover a similar geographical area. Often, different points represent different sites. Antennas correspond to different points when they are sufficiently geographically separated and/or have antenna diagrams pointing in sufficiently different directions. Techniques for CoMP entail introducing dependencies in the scheduling or transmission/reception among different points, in contrast to conventional cellular systems where a point is operated more or less independently from the other points, from a scheduling point of view.

The classical strategy of one cell-id per point is depicted in FIG. 8 for a heterogeneous deployment where a number of low-power (pico) points 120 are placed within the coverage area of a higher power macro point 110. In this deployment, the pico-nodes transmit different cell identifiers, i.e., "cell-id 2", "cell-id 3", and "cell-id 4", from the cell identifier "cell-id 1" transmitted by the macro-cell 110. Note that similar principles obviously also apply to classical macro-cellular deployments where all points have similar output power and perhaps are placed in a more regular fashion than what is the case for a heterogeneous deployment.

An alternative to the classical deployment strategy is to instead let all the UEs within a geographical area outlined by the coverage of the high power macro point be served with signals associated with the same cell-id. In other words, from a UE perspective, the received signals appear as though they come from a single cell. This is illustrated in FIG. 9. Here, all of the pico-nodes 120 transmit the same cell identifier, "cell-id 1", which is also used by the overlaying macro-cell 110.

Note that in both FIGS. 8 and 9 only one macro point is shown; other macro points would typically use different cell-ids (corresponding to different cells) unless they are co-located at the same site (corresponding to other sectors of the macro site). In the latter case of several co-located macro points, the same cell-id may be shared across the co-located macro-points and those pico points that correspond to the union of the coverage areas of the macro points. Sync, BCH and control channels are all transmitted from the high-power point while data can be transmitted to a UE also from low-power points by using shared data transmissions (PDSCH) that rely on UE-specific RS.

Such an approach has benefits for those UEs that are capable of receiving PDSCH based on UE-specific RS, while UEs that only support CRS for PDSCH have to settle for using only the transmission from the high-power point, and thus will not benefit in the downlink from the deployment of extra low-power points. This latter group is likely to include at least all Release 8 and 9 UEs for use in FDD LTE systems.

The single cell-id approach for heterogeneous and/or hierarchical cell deployments is geared towards situations in which there is fast backhaul communication between the points associated with the same cell identifier. A typical case would be a base station serving one or more sectors on a macro level as well as having fast fiber connections to remote radio units (RRUs) performing the role of the other points that share the same cell-id. Those RRUs could represent low-power points with one or more antennas each. Another example is when all the points have a similar power class, with no single point having more significance than the others. The base station would then handle the signals from all RRUs in a similar manner.

A clear advantage of the shared-cell approach compared with the classical one is that the handover procedure between cells only needs to be invoked on a macro basis. Another important advantage is that interference from CRS can be greatly reduced, since CRS does not have to be transmitted from every point. There is also much greater flexibility in coordination and scheduling among the points, which means the network can avoid relying on the inflexible concept of semi-statically configured low-interference subframes, as illustrated in FIG. 7. A shared-cell approach also allows decoupling of the downlink from the uplink, so that, for example, path-loss-based reception-point selection can be performed for the uplink, without creating a severe interference problem for the downlink, where the UE may be served by a transmission point different from the point used in the uplink receptions.

The shared cell-id approach presents some problems when it comes to CSI feedback, however. A single cell may now encompass a large number of antennas, many more than the one to eight transmit antennas for which LTE procedures for CSI feedback were designed. Also, the overhead due to transmitting CSI-RS tends to become large when many antennas are used by the cell.

Furthermore, even in cases when there are eight or fewer antennas sharing the same cell, the distributed placement of these antennas creates a compound channel to the UE, this compound channel having properties that are ill-matched to the design assumptions used for normal CSI feedback procedures, which are designed to match the channel characteristics that result when the antennas are confined to a single transmission point.

To address these issues, then, in several embodiments of the invention CSI-RS are transmitted using different CSI-RS resources on different transmission points within the same cell, while configuration of CSI-RS measurement resources is conducted on a UE-specific basis, where the choice of measurement resource/resources is/are determined by the network, based on the properties of the channels from the transmission points to the UE of interest. As a UE moves around within the cell, the network tracks the channel properties and reconfigures the CSI-RS resources measured by the UE, to correspond to the resource of the "closest" transmission point or points.

At a high-level, a system configured according to some embodiments of the invention includes the following features. First, a set of points are associated with the same cell, in that signals emitted from any of the points in the set are associated with the same cell-id. For example, a given cell in the system might include two or more low-power points, in addition to the high-power point. As discussed earlier, the coverage areas of the low-power points may overlap or fall completely within the coverage area of the high-power point. A control node in the network configures a given UE operating within the cell to measure the channel properties based on a CSI-RS resource transmitted from one of the points when the UE is sufficiently close to that point. Here, "close" is meant in a radio sense, in that a UE that is close to a transmitting point receives the transmitted signal well. Of course, "close" in the radio sense will often, but not always, coincide with "close" in the geographical sense.

When the UE moves closer to another point, however, the network configures the UE to instead measure the channel properties based on CSI-RS transmitted from that other point, using a different CSI-RS resource. The choice of which CSI-RS resource (or resources) that the UE should use at any given time may be made by the network based on measurements on uplink signals (e.g. SRS, PUSCH, PUCCH, etc.), or based on CSI feedback from the UE (or other UEs), or some combination of both.

In some cases, such as in a coordinated multi-point (CoMP) scenario, it may be desirable for the UE to measure CSI-RS resources corresponding to multiple points. In this case, the same general procedure is used, except that references to a single "point" in the discussion immediately above may each be replaced by "a set of points."

In more detail, for CSI feedback modes that utilize CSI-RS, the UE can be configured by means of higher layer signaling from the network to determine which CSI-RS resource to measure on. In various embodiments of the present invention, this configuration is UE-specific. Normally, the configuration of CSI-RS is performed in a cell-specific manner, so that all UEs served by the same cell acquire the same configuration and all UEs make measurements using the same CSI-RS resource. In the case of shared cell-id, however, the UE measurements for CSI feedback need to be carefully controlled from the network to solve the CSI problem. Efficient network control is achieved by configuring the CSI-RS in a UE-specific manner that depends on which transmission point or points within the cell contribute significantly to the received signal for a given UE.

For example, each transmission point may transmit using a CSI-RS resource (as given by the CSI-RS pattern within a subframe, the periodicity and the subframe offset) of its own. As the UE approaches a particular transmission point, the relative strengths of the channels from the different transmission points to the UE are assessed. Based on this assessment, the network decides when to reconfigure the UE to measure CSI-RS on the particular CSI-RS resources that a particular transmission point is using. The network may acquire channel strengths from measurements of uplink signals, including SRS, PUCCH, PUSCH or from multi-CSI-RS resource CSI feedback, if such feedback would be supported in LTE.

Thus, the CSI-RS resource to measure on is configured by the network in a UE-specific manner within the cell, such that the chosen resource is largely determined based on which of the transmission points are best heard by each UE. As a UE moves between the transmission points, the network tracks the channel properties and reconfigures the CSI-RS resource for the UE to correspond to the resource of the "closest" transmission point.

This CSI-RS reconfiguration procedure is also applicable to cases when CoMP is employed. To support effective coordination among the points, the UE needs to feed back CSI corresponding to the channel formed between the UE and multiple transmission points. As an example, a UE may be configured so that it feeds back CSI corresponding to the two or three strongest channels or transmission points. Instead of configuring only one CSI-RS resource for the UE of interest, the network now needs to configure multiple CSI-RS measurement resources within the cell. The network needs to monitor the radio conditions to the points relevant for the UE, and as the radio conditions for the UE varies, the network would reconfigure one or more of the resources with the goal that the UE measures on relevant points (i.e., points which the UE hears sufficiently well). Just as for the non-CoMP CSI-RS case, measurements on uplink signals and their strengths at different reception points could be used as decision basis for the CSI-RS resource measurement set.

Alternatively, a UE may be configured to measure on a larger set of CSI-RS resources, after which measurements a subset of those CSI-RS resources is chosen for the actual CSI feedback. Thus, the best CSI-RS resource measurement subset is determined by actual measurements of the larger set. This measurement on the larger set is, of course, performed by the UE. However, the selection of the best CSI-RS measurement set for evaluating the channel conditions can be performed either by the UE or by the network. In the latter case, the UE sends the measurements corresponding to the larger CSI-RS resource set to the network and then the network instructs the UE which CSI-RS resources to measure on. In the former case, the UE needs to send only CSI for the smaller subset of resources.

Use of the techniques disclosed herein can help ensure that efficient CSI feedback matching the channel properties is obtained from the UEs. Without these transmission and configuration strategies, the UEs could feed back CSI that is ill-matched to the dominating parts of the channel from the transmission points, resulting in a loss of array gain and difficulties in performing multi-user MIMO scheduling.

Figure 10:
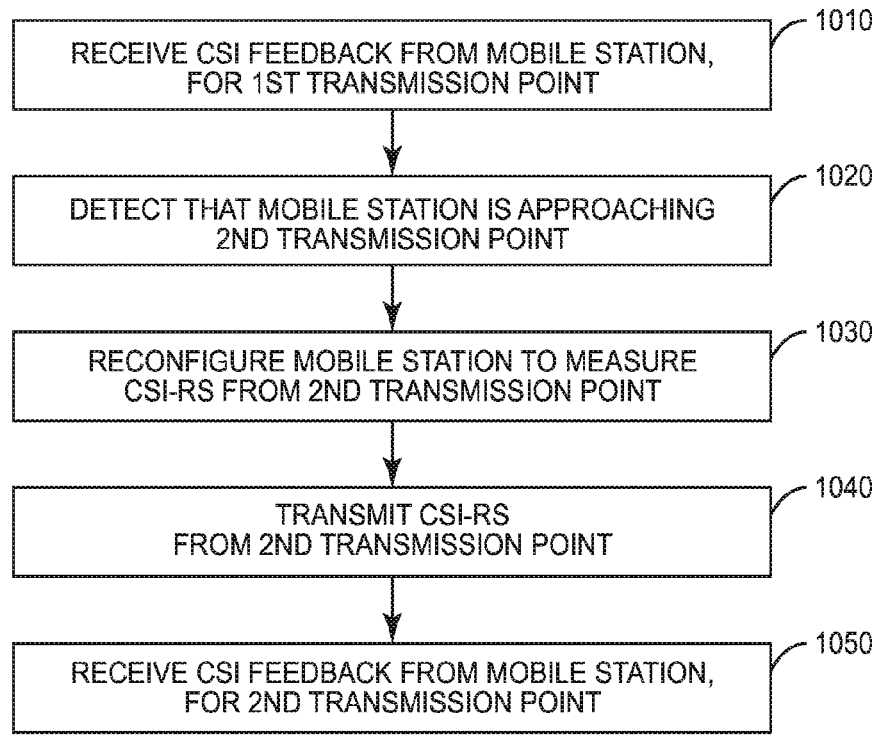
FIG. 10 is a process flow diagram illustrating a method for collecting channel-state-information feedback in a heterogeneous cell deployment.
Figure 11:
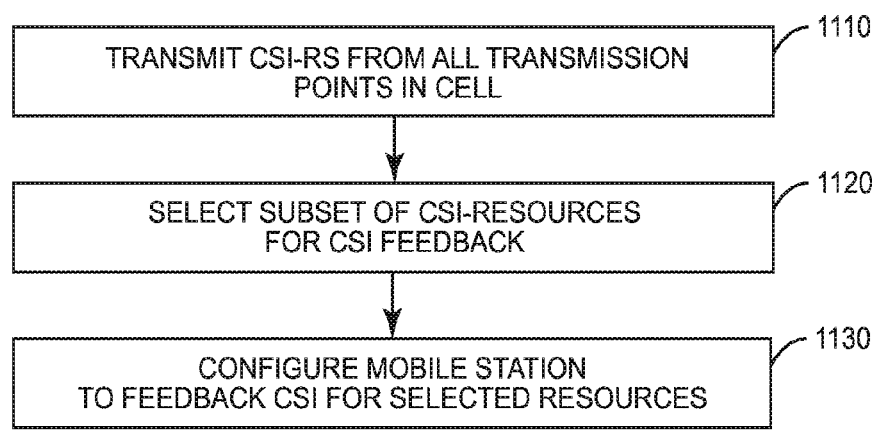
FIG. 11 is a process flow diagram illustrating another method for collecting channel-state-information feedback in a heterogeneous cell deployment.

Given the above details of UE-specific configuration of CSI-RS resources, it will be appreciated that FIGS. 10 and 11 illustrate generalized procedures for collecting channel-state-information (CSI) feedback in a wireless network cell that features a heterogeneous deployment of transmitting points, i.e., including a plurality of geographically separated transmission points sharing a cell identifier and that include a primary transmission point, having a first coverage area, and one or more secondary transmission points, each having a corresponding coverage area that is at least partly within the first coverage area. The illustrated method is carried out at one or more nodes in the radio access network, such as at a control node connected via signaling interfaces to each of the transmission points.

As shown at block 1010 of FIG. 10, the network receives CSI feedback from a mobile station, based on measurements of first CSI reference symbols (CSI-RS) transmitted on a first CSI-RS resource from a first one of the transmission points. The network then detects that the mobile station has approached a second one of the transmission points, differing from the first one of the transmission points. This is shown at block 1020. While several techniques for detecting that a mobile station is approaching a particular transmission point are possible, the term "approaching" here is generally intended to mean that the mobile station is approaching in a radio signal sense, in that the radio channel between the mobile station and the transmission point is improving. Thus, in some cases, this detection may be performed by measuring one or more uplink transmissions from the mobile station at the second one of the transmission points and assessing channel strength based on the measurements. The measured uplink transmission may include one or more of a Sounding Reference Signal (SRS), a Physical Uplink Control Channel (PUCCH) transmission, and a Physical Uplink Shared Channel (PUSCH) transmission.

As shown at block 1030, the network then reconfigures the mobile station to measure CSI-RS on a second CSI-RS resource; these CSI-RS are transmitted from the second one of the transmission points, as shown at block 1040. Finally, as shown at block 1050, the network again receives CSI feedback from the mobile station, this time based on measurements of second CSI-RS transmitted on the second CSI-RS resource from the second one of the transmission points.

The process illustrated in FIG. 10 is not limited to measurements of CSI-RS transmitted by just a single transmission point at any given time. In some embodiments, such as in a CoMP scenario, the network can configure the mobile station to also measure CSI-RS on a third CSI-RS resource transmitted from a third one of the transmission points at the same general time that CSI-RS are also being transmitted from the second transmission point. In this case, the CSI feedback received from the mobile station is further based on measurements of the third CSI-RS, and is thus useful for characterizing the compound channel between the mobile station and the two (or more) different transmission points.

FIG. 11 illustrates a closely related process for collecting channel-state-information (CSI) feedback in a wireless network cell similar to those discussed above. This process begins, as shown at block 1110, with the transmitting of CSI-RS from all of several points in the cell, over a given time interval. In many instances, CSI-RS will be transmitted more-or-less simultaneously from all points in the cell, i.e., from all points that share the same cell-id, but this is not strictly necessary.

As shown at block 1120, a subset of the CSI-RS resources are selected for CSI feedback from a mobile station, based on channel strength measurements corresponding to the mobile station and the transmission points. The mobile station is then configured to provide CSI feedback for at least the selected CSI-RS resources, as shown at block 1130, for use in evaluating the channel between the mobile station and one or several of the transmission points.

In some cases, selecting the subset of the CSI-RS resources is based on measurements of an uplink transmission at one or more of the transmission points. Again, this measured uplink transmission may include one or more of a Sounding Reference Signal (SRS), a Physical Uplink Control Channel (PUCCH) transmission, and a Physical Uplink Shared Channel (PUSCH) transmission. In other cases, the subset of the CSI-RS resources is based on measurement data sent by the mobile station to one or more of the transmission points. In still other cases, a combination of both sources of information may be used.

Other embodiments of the inventive techniques disclosed herein include a wireless system, including a primary node and one or more secondary nodes, corresponding to the methods and techniques described above. In some cases, the methods/techniques described above will be implemented in a system of transmitting nodes such as the one pictured in detail in FIG. 12.

Figure 12:
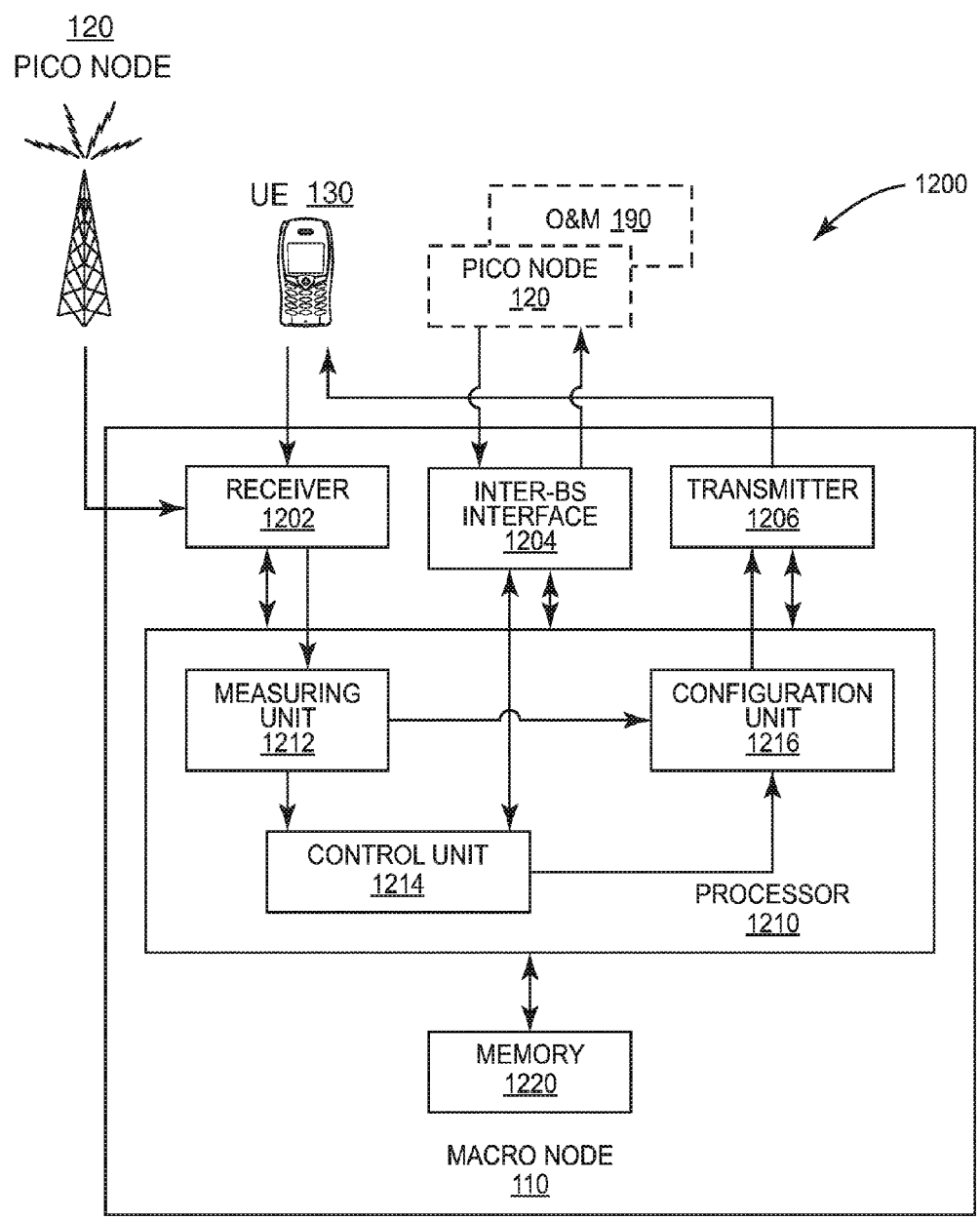
FIG. 12 is a block diagram illustrating features of nodes in a heterogeneous cell deployment.

The system pictured in FIG. 12 includes a macro node 110, two pico nodes 120, a UE 130, and an O&M node 190. The macro node 110 is configured to communicate with pico nodes 120 and O&M node 190 via inter-base-station interface 1204, which comprises suitable network interface hardware controlled by software carrying out network interfacing protocols. Macro node 110 includes a receiver 1202 and transmitter 1206 for communicating with UE 130; in some cases receiver 1202 may also be configured to monitor and/or measure signals transmitted by pico node 120. Receiver circuit 1202 and transmitter circuit 1206 use known radio processing and signal processing components and techniques, typically according to a particular telecommunications standard such as the 3GPP standard for LTE-Advanced. Because the various details and engineering tradeoffs associated with the design of interface circuitry and radio transceiver circuits are well known and are unnecessary to a full understanding of the invention, additional details are not shown here.

Macro node 110 further includes a processing circuit 1210, which includes one or more microprocessors or microcontrollers, as well as other digital hardware, which may include digital signal processors (DSPs), special-purpose digital logic, and the like. Either or both of the microprocessor(s) and the digital hardware may be configured to execute program code stored in memory 1220, along with stored radio parameters. Again, because the various details and engineering tradeoffs associated with the design of baseband processing circuitry for mobile devices and wireless base stations are well known and are unnecessary to a full understanding of the invention, additional details are not shown here. However, several functional aspects of the processing circuit 1210 are shown, including a measuring unit 1212, a control unit 1214, and a configuration unit 1216. Configuration unit 1216 controls radio transmitter 1206 to transmit CRS, CSI-RS, PDSCH, etc., under the control of control unit 1214, which also manages the communications with other nodes via inter-BS interface circuit 1204. Control unit 1214 also evaluates data obtained from measuring unit 1212, such as channel state information and/or load information, and controls inter-base-station communication and transmitter configuration accordingly.

Program code stored in memory circuit 1220, which may comprise one or several types of memory such as read-only memory (ROM), random-access memory, cache memory, flash memory devices, optical storage devices, etc., includes program instructions for executing one or more telecommunications and/or data communications protocols, as well as instructions for carrying out all or part of one or more of the techniques described above, in several embodiments. Radio parameters stored in memory 1220 may include one or more pre-determined tables or other data for supporting these techniques, in some embodiments.

Pico nodes 120 may comprise components and functional blocks very similar to those illustrated in macro node 110, with the corresponding control units being responsible for receiving control instructions from a macro node 110 (or other pico node 120) and configuring the pico node's transmitter circuits accordingly.

In some embodiments a macro node 110 may act as a control node for the purposes of the techniques described above, in that the macro node 110 carries out all or part of one of the methods illustrated in FIGS. 10 and 11, or variants thereof. In other scenarios, a pico node 120 may act as a similar control node. In still other embodiments, the control functionality may be split among two or more physical nodes, which act together as a control node to carry out the above-described techniques for collecting channel-state information in a heterogeneous cell deployment. Thus, the term "control node," as used herein, is not limited to a unitary piece of equipment at a single physical location, but may also refer to a collection of network equipment operating together.

Figure 13:
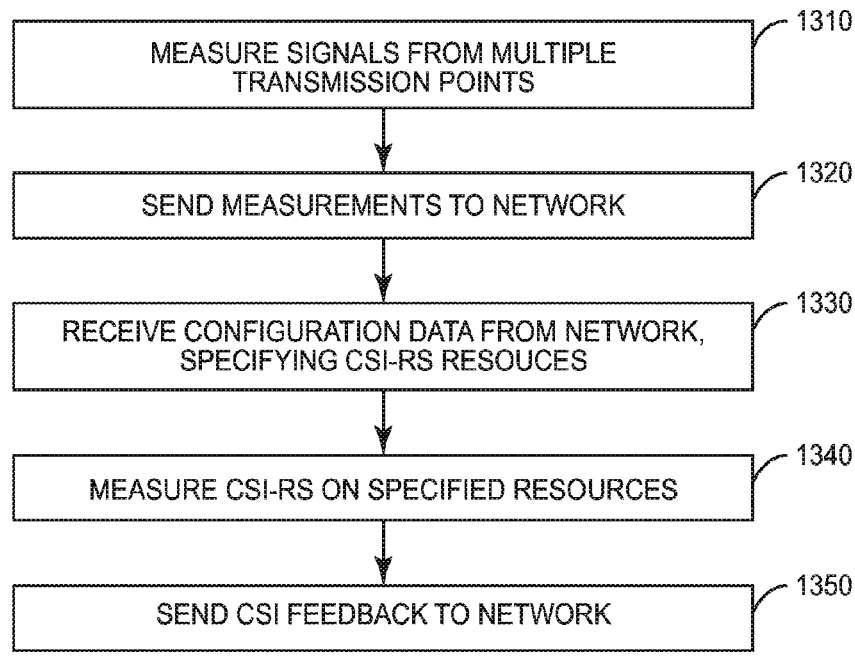
FIG. 13 is a process flow diagram illustrating a method for providing channel-state-information in a heterogeneous cell deployment.

Still other embodiments of the inventive techniques described herein include methods implemented at a mobile station operating in a heterogeneous cell deployment as described above. FIG. 13, in particular, illustrates an example of one such process for providing channel-state-information (CSI) feedback in a wireless network cell that comprises a plurality of geographically separated transmission points sharing a cell identifier, the transmission points including a primary transmission point, having a first coverage area, and one or more secondary transmission points, each having a corresponding coverage area that is entirely or substantially within the first coverage area.

The illustrated method begins, as shown at block 1310, with the measuring, in a mobile station, of signals transmitted from two or more of the transmission points in the cell. The resulting measurements are sent to at least one of the transmission points, as shown at block 1320. The mobile station then receives configuration information from at least one of the transmission points, the configuration information instructing the mobile station to measure CSI reference symbols (CSI-RS) from two or more CSI-RS resources corresponding to at least two of the transmission points. This is shown at block 1330. The mobile station measures CSI-RS from the two or more CSI-RS resources, as shown at block 1340, and sends CSI feedback to at least one of the transmission points, based on the measured CSI-RS, as shown at block 1350.

Figure 14:
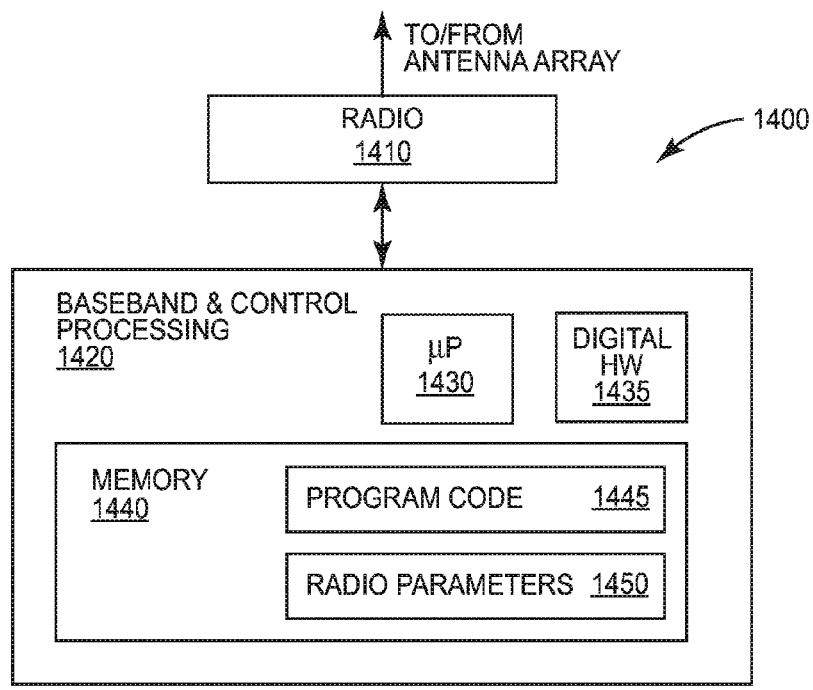
FIG. 14 is a block diagram illustrating components of an example mobile station.

An example of a mobile station configured to carry out the method of FIG. 13, or variants thereof, is shown in FIG. 14. Of course, not every detail of the mobile station design is shown, but instead a few of the components relevant to the present techniques are pictured. The pictured apparatus includes radio circuitry 1410 and baseband & control processing circuit 1420. Radio circuitry 1410 includes receiver circuits and transmitter circuits that use known radio processing and signal processing components and techniques, typically according to a particular telecommunications standard such as the 3GPP standard for LTE and/or LTE-Advanced. Again, because the various details and engineering tradeoffs associated with the design and implementation of such circuitry are well known and are unnecessary to a full understanding of the invention, additional details are not shown here.

Baseband & control processing circuit 1420 includes one or more microprocessors or microcontrollers 1430, as well as other digital hardware 1435, which may include digital signal processors (DSPs), special-purpose digital logic, and the like. Either or both of microprocessor(s) 1430 and digital hardware 1435 may be configured to execute program code 1445, which is stored in memory 1440 along with radio parameters 1450. Once more, because the various details and engineering tradeoffs associated with the design of baseband processing circuitry for mobile devices are well known, additional details are not shown here The program code 1445 stored in memory circuit 1440, which may comprise one or several types of memory such as read-only memory (ROM), random-access memory, cache memory, flash memory devices, optical storage devices, etc., includes program instructions for executing one or more telecommunications and/or data communications protocols, as well as instructions for carrying out one or more of the techniques described above, in several embodiments. Radio parameters 1450 include various configuration parameters as well as parameters determined from system measurements, such as channel measurements, and may include configuration data indicating which CSI-RS should be measured, as well as measurement data resulting from such measurements.

Accordingly, in various embodiments of the invention, a processing circuit, such as the baseband & control processing circuit 1420 of FIG. 14, is configured to carry out one or more of the techniques described above for providing channel-state-information (CSI) feedback in a wireless network cell that comprises a plurality of geographically separated transmission points sharing a cell identifier. As described above, this processing circuit is configured with appropriate program code, stored in one or more suitable memory devices, to implement one or more of the techniques described herein. Of course, it will be appreciated that not all of the steps of these techniques are necessarily performed in a single microprocessor or even in a single module.

Examples of several embodiments of the present invention have been described in detail above, with reference to the attached illustrations of specific embodiments. Because it is not possible, of course, to describe every conceivable combination of components or techniques, those skilled in the art will appreciate that the present invention can be implemented in other ways than those specifically set forth herein, without departing from essential characteristics of the invention. The present embodiments are thus to be considered in all respects as illustrative and not restrictive.

What is claimed is:

1. A method in a mobile station for providing channel-state-information (CSI) feedback in a wireless network that comprises a plurality of geographically separated transmission points sharing a cell identifier, the method comprising:

receiving configuration information from the wireless network, said configuration information instructing the mobile station to measure CSI reference symbols (CSI-RS) used by a first one of the transmission points;

measuring first CSI-RS transmitted on a first CSI-RS resource from the first one of the transmission points;

sending first CSI feedback to the wireless network, based on measurements of the first CSI-RS;

subsequent to the sending of first CSI feedback to the wireless network, receiving reconfiguration information from the wireless network, said reconfiguration information instructing the mobile station to measure CSI-RS on a second CSI-RS resource transmitted from a second one of the transmission points, wherein the second CSI-RS resource is different from the first CSI-RS resource;

measuring second CSI-RS transmitted on the second CSI-RS resource from the second one of the transmission points; and sending second CSI feedback to the wireless network, based on measurements of the second CSI-RS.

2. A mobile station configured to provide channel-state-information (CSI) feedback to a wireless network that comprises a plurality of geographically separated transmission points sharing a cell identifier, the mobile station comprising:

a radio circuit configured to receive signals transmitted from the wireless network and send data to the wireless network; and a processing circuit configured to:

receive configuration information from the wireless network, via the radio circuit, said configuration information instructing the mobile station to measure CSI reference symbols (CSI-RS) used by a first one of the transmission points;

measure first CSI-RS transmitted on a first CSI-RS resource from the first one of the transmission points and received by the radio circuit;

send, using the radio circuit, first CSI feedback to the wireless network, based on measurements of the first CSI-RS;

subsequent to sending the first CSI feedback to the wireless network, receive reconfiguration information from the wireless network, via the radio circuit, said reconfiguration information instructing the mobile station to measure CSI-RS on a second CSI-RS resource transmitted from a second one of the transmission points, wherein the second CSI-RS resource is different from the first CSI-RS resource;

measure second CSI-RS transmitted on the second CSI-RS resource from the second one of the transmission points and received by the radio circuit; and send, using the radio circuit, second CSI feedback to the wireless network, based on measurements of the second CSI-RS.

3. A method within a wireless system, the wireless system including a plurality of geographically-separated transmission points sharing a cell identifier, a mobile station, and a network node for collecting channel-state-information (CSI) feedback from the mobile station, the method comprising:

sending, from the network node, first configuration information to the mobile station, the first configuration information instructing the mobile station to measure CSI reference symbols (CSI-RS) used by a first one of the transmission points;

responsive to reception of the first configuration information at the mobile station, measuring, at the mobile station, first CSI-RS transmitted on a first CSI-RS resource indicated in the first configuration information;

sending, from the mobile station, first CSI feedback to the network node, wherein the first CSI feedback is based upon the measured first CSI-RS;

receiving, at the network node, the first CSI feedback from the mobile station;

detecting, at the network node, that the mobile station has approached a second one of the transmission points, differing from the first one of the transmission points;

responsive to said detecting, sending, from the network node, reconfiguration information to the mobile station, the reconfiguration information instructing the mobile station to measure second CSI-RS on a second CSI-RS resource transmitted from the second one of the transmission points;

responsive to reception of the reconfiguration information at the mobile station, measuring, at the mobile station, second CSI-RS transmitted on a second CSI-RS resource indicated in the reconfiguration information;

sending, from the mobile station, second CSI feedback to the network node, wherein the second CSI feedback is based upon the measured second CSI-RS; and receiving, at the network node, the second CSI feedback from the mobile station.

4. The method of claim 3, wherein the transmission points include a primary, high-power transmission point, having a first coverage area, and one or more secondary, low-power, transmission points, each having a coverage area that is within or substantially within the first coverage area.

5. The method of claim 4, wherein the network node is part of the primary transmission node, and the primary node corresponds to the first one of the transmission points.

6. The method of claim 4, wherein the network node is part of a secondary transmission node, and the secondary transmission node corresponds to the second one of the transmission points.

7. The method of claim 3, wherein the network node is not part of a transmission point, wherein the network node is connected to the transmission points via signaling interfaces, and wherein the sending of information to the mobile station and the receiving of feedback from the mobile station comprises sending the information to one or more of the transmission points and receiving feedback from one or more of the transmission points.

8. The method of claim 3, wherein detecting that the mobile station has approached a second one of the transmission points comprises measuring an uplink transmission from the mobile station at the second one of the transmission points and assessing channel strength based on said measuring.

* * * * *

UNITED STATES PATENT AND TRADEMARK OFFICE
CERTIFICATE OF CORRECTION

PATENT NO. : 9,780,971 B2  
APPLICATION NO. : 14/988903  
DATED : October 3, 2017  
INVENTOR(S) : Jöngren et al.

Page 1 of 1

It is certified that error appears in the above-identified patent and that said Letters Patent is hereby corrected as shown below:

In the Specification

In Column 1, Line 7, delete "2012," and insert -- 2012, now Pat. No. 9,264,927, --, therefor.

In Column 2, Line 37, delete "carrier" and insert -- carrier. --, therefor.

In Column 7, Line 28, delete "(Cal)." and insert -- (CQI). --, therefor.

In Column 11, Line 7, delete "macro" and insert -- (macro) --, therefor.

In Column 17, Line 24, delete "here" and insert -- here. --, therefor.

In the Claims

In Column 20, Line 7, in Claim 5, delete "of the" and insert -- of a --, therefor.

In Column 20, Line 7, in Claim 5, delete "primary node" and insert -- primary transmission node --, therefor.

Signed and Sealed this  
First Day of May, 2018

Andrei Iancu  
*Director of the United States Patent and Trademark Office*